(12) United States Patent
Lee et al.

(10) Patent No.: US 9,054,820 B2
(45) Date of Patent: Jun. 9, 2015

(54) SIGNATURE-BASED PROGRAM IDENTIFICATION APPARATUS AND METHODS FOR USE WITH DIGITAL BROADCAST SYSTEMS

(75) Inventors: Morris Lee, Palm Harbor, FL (US); William H. Schilp, Palm Harbor, FL (US); Michael A. Hicks, Clearwater, FL (US); Ronald Schwerer, Belleair Beach, FL (US); David H. Wright, Safety Harbor, FL (US); Kevin Deng, Safety Harbor, FL (US)

(73) Assignee: THE NIELSEN COMPANY (US), LLC, Schaumburg, IL (US)

( * ) Notice: Subject to any disclaimer, the term of this patent is extended or adjusted under 35 U.S.C. 154(b) by 5 days.

(21) Appl. No.: 13/558,224

(22) Filed: Jul. 25, 2012

(65) Prior Publication Data
US 2012/0291058 A1    Nov. 15, 2012

Related U.S. Application Data

(63) Continuation of application No. 11/312,789, filed on Dec. 20, 2005, now Pat. No. 8,255,938, which is a continuation of application No. PCT/US03/22562, filed on Jul. 18, 2003.

(60) Provisional application No. 60/480,068, filed on Jun. 20, 2003.

(51) Int. Cl.
*H04H 60/32* (2008.01)
*H04H 60/58* (2008.01)
(Continued)

(52) U.S. Cl.
CPC ........... *H04H 60/58* (2013.01); *G06Q 20/1235* (2013.01); *H04H 60/372* (2013.01); *H04H 60/40* (2013.01); *H04H 60/43* (2013.01); *H04H 60/56* (2013.01); *H04H 60/59* (2013.01); *H04H 2201/90* (2013.01); *H04N 7/17309* (2013.01);
(Continued)

(58) Field of Classification Search
USPC ....................................... 725/19, 32, 35, 115
See application file for complete search history.

(56) References Cited

U.S. PATENT DOCUMENTS

| 4,230,990 A | 10/1980 | Lert, Jr. et al. |
| 4,677,466 A | 6/1987 | Lert, Jr. et al. |

(Continued)

FOREIGN PATENT DOCUMENTS

| AU | 678163 | 11/1993 |
| AU | 718227 | 4/2000 |

(Continued)

OTHER PUBLICATIONS

Canadian Intellectual Property Office, "Notice of Allowance," issued in connection with corresponding Canadian patent application No. 2,530,012, on May 27, 2011 (2 pages).

(Continued)

*Primary Examiner* — Pankaj Kumar
*Assistant Examiner* — Charles N Hicks
(74) *Attorney, Agent, or Firm* — Hanley, Flight & Zimmerman, LLC

(57) ABSTRACT

Signature-based program identification apparatus and methods for use with digital audio and/or video systems are disclosed. The disclosed systems and methods develop signatures of digital audio and/or video content from a digital data stream at two or more sites and compare the signatures to one another to identify the content.

28 Claims, 5 Drawing Sheets

(51) Int. Cl.
  *G06Q 20/12* (2012.01)
  *H04H 60/37* (2008.01)
  *H04H 60/56* (2008.01)
  *H04H 60/59* (2008.01)
  *H04N 7/173* (2011.01)
  *H04N 21/234* (2011.01)
  *H04N 21/258* (2011.01)
  *H04N 21/433* (2011.01)
  *H04N 21/44* (2011.01)
  *H04N 21/658* (2011.01)
  *H04N 21/8352* (2011.01)
  *H04H 60/40* (2008.01)
  *H04H 60/43* (2008.01)

(52) U.S. Cl.
  CPC ... *H04N 21/23418* (2013.01); *H04N 21/25891* (2013.01); *H04N 21/433* (2013.01); *H04N 21/44008* (2013.01); *H04N 21/6582* (2013.01); *H04N 21/8352* (2013.01)

(56) References Cited

U.S. PATENT DOCUMENTS

| | | | |
|---|---|---|---|
| 4,697,209 A | 9/1987 | Kiewit et al. | |
| 4,739,398 A | 4/1988 | Thomas et al. | |
| 5,404,160 A | 4/1995 | Schober et al. | |
| 5,436,653 A | 7/1995 | Ellis et al. | |
| 5,450,490 A | 9/1995 | Jensen et al. | |
| 5,481,294 A | 1/1996 | Thomas et al. | |
| 5,485,518 A | 1/1996 | Hunter et al. | |
| 5,504,518 A * | 4/1996 | Ellis et al. | 725/22 |
| 5,572,246 A | 11/1996 | Ellis et al. | |
| 5,574,962 A | 11/1996 | Fardeau et al. | |
| 5,579,124 A | 11/1996 | Aijala et al. | |
| 5,581,658 A | 12/1996 | O'Hagan et al. | |
| 5,581,800 A | 12/1996 | Fardeau et al. | |
| 5,612,729 A | 3/1997 | Ellis et al. | |
| 5,621,454 A | 4/1997 | Ellis et al. | |
| 5,689,509 A | 11/1997 | Gaytan et al. | |
| 5,764,763 A | 6/1998 | Jensen et al. | |
| 5,793,759 A | 8/1998 | Rakib et al. | |
| 5,809,160 A | 9/1998 | Powell et al. | |
| 5,822,436 A | 10/1998 | Rhoads | |
| 5,898,836 A | 4/1999 | Freivald et al. | |
| 5,974,299 A | 10/1999 | Massetti | |
| 5,978,842 A | 11/1999 | Noble et al. | |
| 5,999,689 A | 12/1999 | Iggulden | |
| 6,002,443 A | 12/1999 | Iggulden | |
| 6,072,888 A | 6/2000 | Powell et al. | |
| 6,112,053 A | 8/2000 | Dunki-Jacobs et al. | |
| 6,157,719 A | 12/2000 | Wasilewski et al. | |
| 6,184,918 B1 | 2/2001 | Goldschmidt Iki et al. | |
| 6,301,369 B2 | 10/2001 | Powell et al. | |
| 6,343,138 B1 | 1/2002 | Rhoads | |
| 6,385,330 B1 | 5/2002 | Powell et al. | |
| 6,404,898 B1 | 6/2002 | Rhoads | |
| 6,421,445 B1 | 7/2002 | Jensen et al. | |
| 6,459,803 B1 | 10/2002 | Powell et al. | |
| 6,467,089 B1 | 10/2002 | Aust et al. | |
| 6,469,749 B1 | 10/2002 | Dimitrova et al. | |
| 6,496,591 B1 | 12/2002 | Rhoads | |
| 6,513,161 B2 | 1/2003 | Wheeler et al. | |
| 6,523,114 B1 * | 2/2003 | Barton | 713/176 |
| 6,542,620 B1 | 4/2003 | Rhoads | |
| 6,560,350 B2 | 5/2003 | Rhoads | |
| 6,567,780 B2 | 5/2003 | Rhoads | |
| 6,574,594 B2 | 6/2003 | Pitman et al. | |
| 6,577,346 B1 | 6/2003 | Perlman | |
| 6,590,998 B2 | 7/2003 | Rhoads | |
| 6,597,405 B1 | 7/2003 | Iggulden | |
| 6,604,072 B2 | 8/2003 | Pitman et al. | |
| 6,614,915 B2 | 9/2003 | Powell et al. | |
| 6,633,651 B1 | 10/2003 | Hirzalla et al. | |
| 6,647,129 B2 | 11/2003 | Rhoads | |
| 6,647,130 B2 | 11/2003 | Rhoads | |
| 6,675,383 B1 | 1/2004 | Wheeler et al. | |
| 6,678,392 B2 | 1/2004 | Powell et al. | |
| 6,735,775 B1 | 5/2004 | Massetti | |
| 6,754,377 B2 | 6/2004 | Rhoads | |
| 6,788,800 B1 | 9/2004 | Carr et al. | |
| 6,829,368 B2 | 12/2004 | Meyer et al. | |
| 6,839,751 B1 | 1/2005 | Dietz et al. | |
| 6,845,360 B2 | 1/2005 | Jensen et al. | |
| 6,862,355 B2 | 3/2005 | Kolessar et al. | |
| 6,871,180 B1 | 3/2005 | Neuhauser et al. | |
| 6,959,386 B2 | 10/2005 | Rhoads | |
| 6,996,237 B2 | 2/2006 | Jensen et al. | |
| 7,239,981 B2 | 7/2007 | Kolessar et al. | |
| 7,316,025 B1 | 1/2008 | Aijala et al. | |
| 7,326,025 B2 | 2/2008 | Viluan et al. | |
| 7,617,509 B1 * | 11/2009 | Brunheroto et al. | 725/19 |
| 7,961,881 B2 | 6/2011 | Jensen et al. | |
| RE42,627 E | 8/2011 | Neuhauser et al. | |
| 8,260,113 B2 | 9/2012 | Aijala et al. | |
| 2001/0005823 A1 | 6/2001 | Fischer et al. | |
| 2002/0010919 A1 | 1/2002 | Lu et al. | |
| 2002/0026635 A1 | 2/2002 | Wheeler et al. | |
| 2002/0059577 A1 | 5/2002 | Lu et al. | |
| 2002/0120925 A1 | 8/2002 | Logan | |
| 2002/0178410 A1 | 11/2002 | Haitsma et al. | |
| 2002/0186768 A1 | 12/2002 | Dimitrova et al. | |
| 2003/0005430 A1 | 1/2003 | Kolessar | |
| 2003/0023967 A1 | 1/2003 | Kim | |
| 2003/0037333 A1 | 2/2003 | Ghashghai et al. | |
| 2003/0051249 A1 | 3/2003 | Hoang | |
| 2003/0066070 A1 | 4/2003 | Houston | |
| 2003/0086341 A1 | 5/2003 | Wells et al. | |
| 2003/0131350 A1 | 7/2003 | Peiffer et al. | |
| 2003/0169879 A1 | 9/2003 | Akins, III et al. | |
| 2004/0122679 A1 | 6/2004 | Neuhauser et al. | |
| 2004/0210922 A1 | 10/2004 | Peiffer et al. | |
| 2007/0288476 A1 | 12/2007 | Flanagan, III et al. | |
| 2010/0049474 A1 | 2/2010 | Kolessar et al. | |
| 2010/0226494 A1 | 9/2010 | Lynch et al. | |
| 2010/0268540 A1 | 10/2010 | Arshi et al. | |
| 2010/0268573 A1 | 10/2010 | Jain et al. | |
| 2011/0106587 A1 | 5/2011 | Lynch et al. | |
| 2011/0224992 A1 | 9/2011 | Chaoui et al. | |

FOREIGN PATENT DOCUMENTS

| | | |
|---|---|---|
| AU | 747044 | 5/2002 |
| EP | 0161512 | 11/1985 |
| EP | 0210609 | 2/1987 |
| EP | 1041767 | 10/2000 |
| EP | 1043854 | 10/2000 |
| GB | 2338869 | 12/1999 |
| JP | 2000-517141 | 12/2000 |
| WO | 88/10540 | 12/1988 |
| WO | 93/22875 | 11/1993 |
| WO | 95/12278 | 5/1995 |
| WO | 95/27349 | 10/1995 |
| WO | 98/32251 | 7/1998 |
| WO | 99/59275 | 11/1999 |
| WO | 00/65765 | 11/2000 |
| WO | 01/61892 | 8/2001 |
| WO | 02/37316 | 5/2002 |
| WO | 02/062007 | 8/2002 |
| WO | 03/007235 | 1/2003 |
| WO | 03/026169 | 3/2003 |
| WO | 03/060630 | 7/2003 |
| WO | 2005/006768 | 1/2005 |

OTHER PUBLICATIONS

International Search Authority, "International Preliminary Report on Patentability," issued in connection with corresponding International patent application No. PCT/US03/22562, on Oct. 30, 2007 (4 pages).

(56) References Cited

OTHER PUBLICATIONS

Mexican Institute of Industrial Property, "Office Action," issued in connection with corresponding Mexican patent application No. PA/a/2005/014162, on Dec. 2, 2008 (3 pages).
European Patent Office, "Supplemental European Search Report," issued in connection with corresponding European patent application No. 03817463.7, on Oct. 22, 2007 (5 pages).
International Preliminary Examining Authority, "Written Opinion," issued in connection with corresponding International patent application No. PCT/US03/22562, on Apr. 18, 2007 (6 pages).
European Patent Office, "Office Action," issued in connection with corresponding European patent application No. 03817463.7, on Nov. 26, 2013 (4 pages).

* cited by examiner

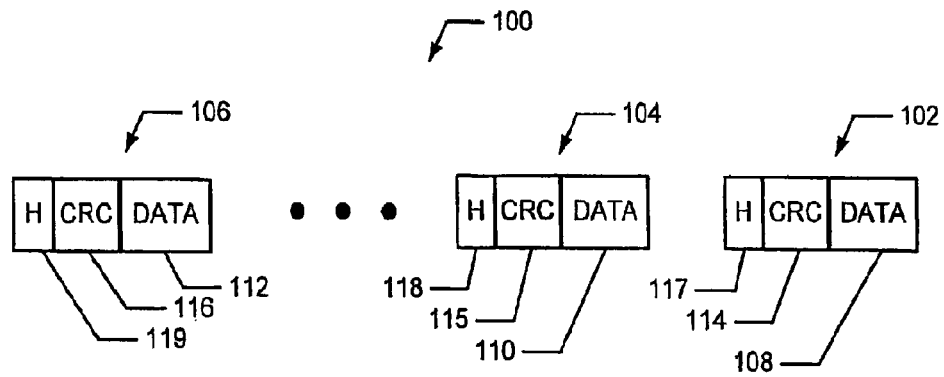
FIG. 3
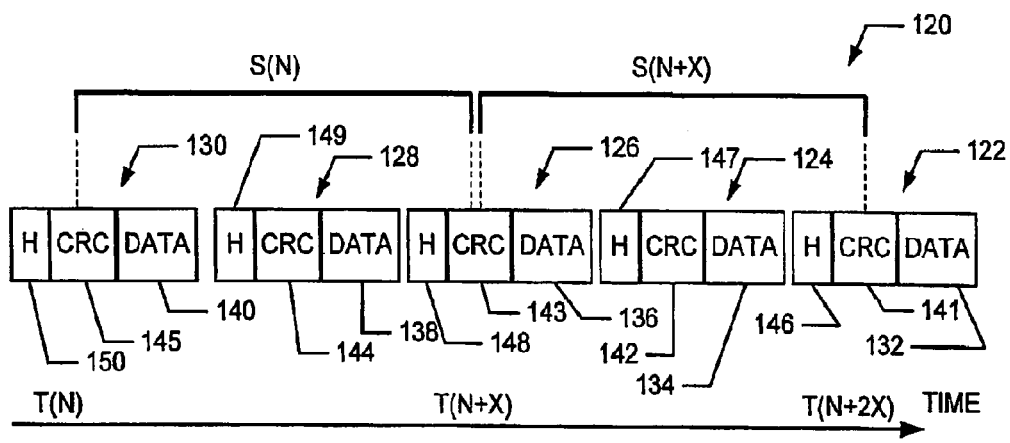
FIG. 4
FIG. 5

SIGNATURE-BASED PROGRAM IDENTIFICATION APPARATUS AND METHODS FOR USE WITH DIGITAL BROADCAST SYSTEMS

RELATED APPLICATIONS

This patent is a continuation of U.S. patent application Ser. No. 11/312,789, filed Dec. 20, 2005, which is a continuation of PCT International Application Ser. No. PCT/US03/22562, filed Jul. 18, 2003, which claims benefit of U.S. Provisional Patent Application Ser. No. 60/480,068, entitled "Signature-Based Program Identification Apparatus and Methods for use with Digital Broadcast Systems," filed on Jun. 20, 2003, which are hereby incorporated by reference in their entireties.

FIELD OF THE DISCLOSURE

The present disclosure relates generally to digital broadcast systems and, more specifically, to signature-based audio/video content identification apparatus and methods for use with digital audio/video content delivery systems.

BACKGROUND

Digital audio/video content delivery and distribution systems have undergone rapid development and deployment in recent years due, at least in part, to their ability to efficiently distribute large numbers of high-fidelity video and/or audio content and programs as well as other digital services or content over a wide geographic region. For example, in the case of satellite-based digital television and wireless digital video/audio delivery systems, little, if any, land-based infrastructure (e.g., ground stations, cable lines, etc.) is needed to provide services to subscribers on a world-wide basis. As a result, such satellite-based and other wireless systems enable digital broadcasters and audio/video content providers to develop markets for their content, programs and/or services in remote and/or underdeveloped regions of the world in a cost-effective manner.

In general, regardless of whether a digital audio/video content delivery system uses one or more satellites, cable transmission lines, ground-based wireless transmission stations, the Internet or any combination thereof, such a system enables users to receive high-fidelity video and/or audio content, as well as user-interactive features or tools such as, for example, pictographic program guides, grid-based guides, etc. that enable users to plan and perform program consumption activities. More specifically, digital audio/video content delivery systems that deliver digital television may transmit one or more high-bandwidth signals, each of which is typically composed of a stream of data or data packets having a plurality of video, audio and/or other digital programs multiplexed therein. Users or subscribers typically have a digital decoder unit which, in the case of a digital video or television system, is commonly referred to as a "set-top box." The set-top box can, based on subscriber commands, selectively de-multiplex data packets associated with a particular program from a particular data stream, decode those data packets and send a signal to a television or video monitor for viewing. Some digital televisions provide integrated or built-in set-top box functionality and, thus, do not require a separate set-top box.

Of course, as is the case with analog content providers and broadcasters, digital content providers and broadcasters (e.g., digital television, audio, etc.) desire to meter (i.e., monitor) the consumption of the programs and/or other services provided to users or subscribers to thereby generate audience program consumption behavior or patterns. Such audience consumption behavior or patterns may be used to develop program ratings information, to improve targeted marketing or advertising campaigns, to improve the types of programs and/or services and the times at which those programs and/or services are delivered, to assess the value of a particular time slot and program for purposes of determining what advertisers should pay for usage of that time slot, etc.

A metering system designed for use with an analog content delivery system, such as an analog television system, generates viewing records or other viewing information that is typically collected from a group of statistically selected households. Each of the statistically selected households has a data logging and processing unit commonly referred to as a "home unit" or "site unit." The site unit is usually coupled to a variety of attachments that provide inputs to the site unit or that receive outputs from the site unit. For example, a frequency detector may be used to detect the local oscillator frequency of the television to identify the channel to which the television is currently tuned. Also, for example, a people counter, may be located in the viewing space of the television and in communication with the site unit, thereby enabling the site unit to actively or passively detect the identities of the persons currently viewing programs displayed on the television. In some cases, the metering system is designed to capture signature information associated with audio and/or video content that has been consumed in the household.

The site unit usually processes its inputs, including the inputs from its attachments, to produce viewing records. In general, the viewing records typically contain program identification information (i.e., information that can be used to identify a particular program, such as channel information obtained from the frequency detector and signature information) and audience information such as the numbers and/or identities of people viewing that particular program obtained from the people counter. The viewing records may be generated on a periodic basis (i.e., at fixed time intervals) or may be generated in response to a change in an input such as, for example, a change in the identities or number of persons viewing the television, a change in the channel tuning information (i.e., a channel change), etc. Of course, viewing records may contain any other information such as the identities of viewers present at the viewing time.

Often, the site unit collects a quantity of viewing records and transmits collected viewing records, usually daily, to a central office or data processing facility for further processing or analysis. The data processing facility receives viewing records from site units located in some or all of the statistically selected households and additionally receives information from one or more reference sites. The reference sites are typically configured to capture information associated with the audio/video content broadcast to specific content distribution areas. For example, a reference site may collect signatures for all of the audio and/or video content distributed within its assigned area and then transmit the collected signatures to the data processing facility. The data processing facility analyzes the viewing records to ascertain the viewing behaviors of a particular household or group of households selected from all participating households. Additionally, the central data processing facility may generate viewing behavior statistics and other parameters indicative of viewing behavior associated with all of the participating households.

To generate viewing behavior information from viewing records, the central office or data processing facility may compare each of the signatures generated by a household unit to the signatures generated by the reference site. When a signature from the household unit matches a signature from a reference site, the identity of the content associated with matching signatures may be determined using data such as a list of content (i.e., a schedule lineup of television programming or television guide) associated with the reference site signatures and/or the time at which, and the channel from which, the signature was captured at the reference site. Such a matching process may be carried out for each of the viewing records received by the data processing facility, thereby enabling the data processing facility to reconstruct what programs were watched by all participating households and the times at which the programs were watched. Alternatively, such a matching process may be used only when other data, such as channel data or time data, is unavailable.

Signature information may be used in the foregoing manner to perform content identification because each signature is designed to uniquely correspond to the content from which it was collected. Thus, a match between two signatures indicates that the matching signatures were derived from the same content. While a variety of signature generation and capture techniques are well known in the art, such techniques are suited for use with audio/video content in an analog format.

BRIEF DESCRIPTION OF THE DRAWINGS

FIG. 3 is a diagrammatic view of an example data stream that may be used with the example system shown in FIG. 1.

FIG. 4 is a diagrammatic view of an example manner in which content reference signature information may be generated using an example digital data stream.

FIG. 5 depicts an example data structure that may be used to store reference signature information generated using the technique shown in FIG. 4 for a plurality of programs.

DETAILED DESCRIPTION

Figure 1:
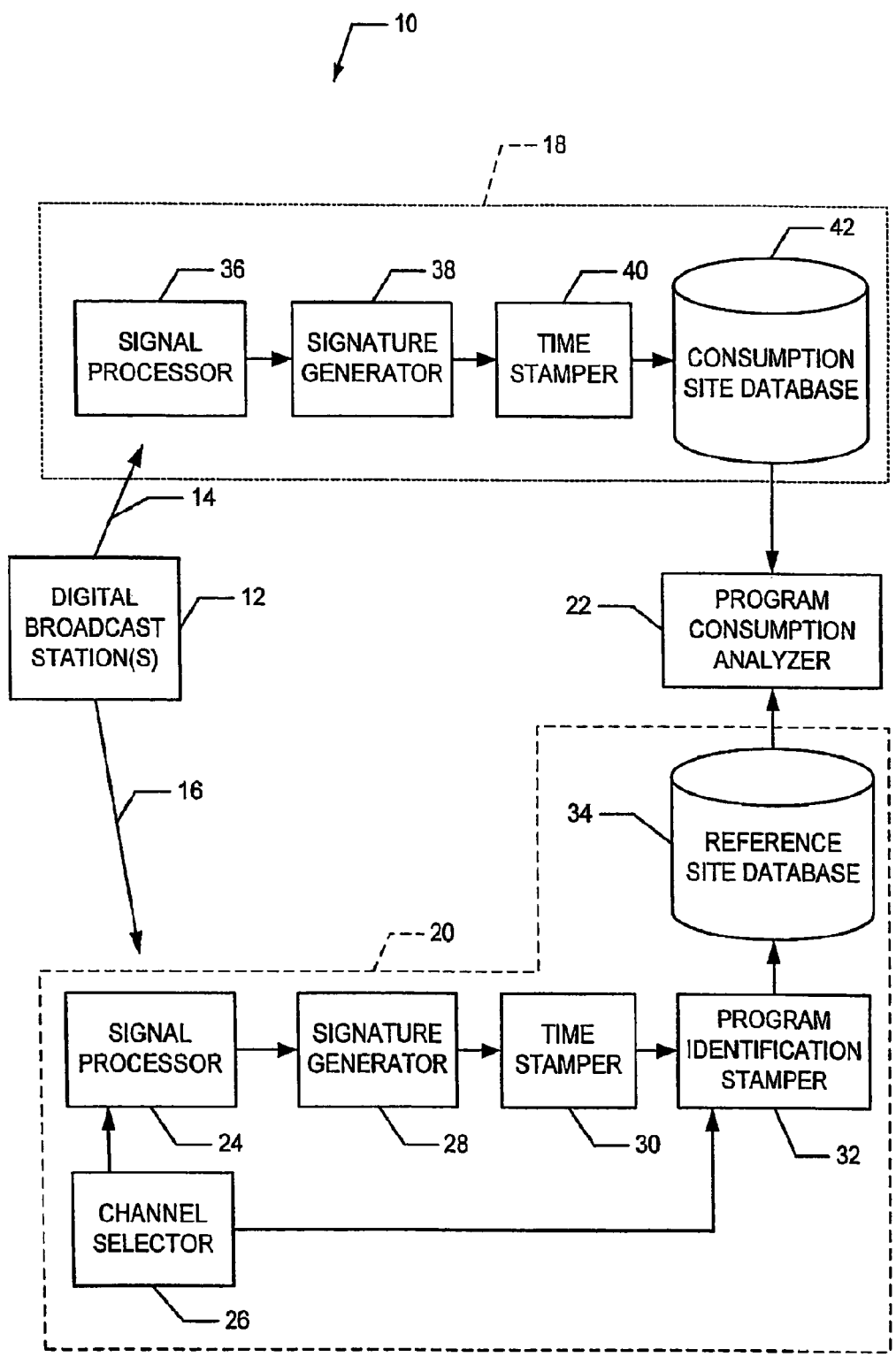
FIG. 1 is a block diagram of an example system that uses signatures to identify digital audio/video content.

FIG. 1 is a block diagram of an example system 10 that uses signatures to identify digital audio and/or video content. For purposes of illustration only, the system 10 is portrayed as a digital television broadcast system. However, the system may be implemented as any type of system configured to deliver audio/video content remotely and/or locally for consumption at a consumption site. The system 10 may include one or more digital broadcast stations 12 that transmit video programs, audio programs and/or other digital content or programs (e.g., television programs, advertisements, etc.) via communication paths or links 14 and 16 to at least one consumption site 18 and at least one reference site 20. The digital broadcast stations 12 may include one or more television stations, radio stations, Internet providers or any other transmission sites capable of transmitting video and/or audio content in a digital format. The communication paths or links 14, 16 may be implemented using any desired combination of wireless and hardwired links, including, for example, satellite links, cellular links, telephone lines, cable, Internet, a digital subscriber line, WiFi, Ethernet, etc. Of course, in the case where the digital broadcast stations 12 are transmitting television programs, the digital signals conveyed via the links 14, 16 contain both video and audio information and, in some cases, may also contain other information for providing a graphical program guide and/or other user-interactive features. In the case where the digital broadcast stations 12 are transmitting a plurality of programs simultaneously, the program information may be transmitted using a plurality of separately modulated signals (i.e., independent signals), using one or more multi-program signals (i.e., signals within which multiple programs are multiplexed), or any combination thereof. For illustrative purposes only, the system 10 described herein and the examples described with respect thereto refer to broadcast content and/or broadcast programs. Broadcast content, as used herein, refers to content that is widely disseminated via any transmission method including any of the methods described above. However, the system described herein is not limited to use with systems that deliver and receive broadcast content. To the contrary, the system described herein is more generally applicable and, thus, is also suitable for use with systems that deliver and receive local content. For example, a television may be used to consume digital content supplied via a local source such as a digital video device (DVD). The system 10 described herein can be used to generate signatures and identify content delivered locally as well as content delivered via a broadcast system and can be used to generate signatures and identify content that was delivered via a broadcast system and then recorded for playback at a later time via a local device, such as a video cassette player, a digital video recorder, etc. Of course, signatures generated using content delivered via a local source can only be identified if the data processing facility has reference signatures that correspond to such locally delivered content. Signatures that correspond to locally delivered content can typically be obtained by using publicly released content that is usually consumed via a local device such as movies available on video cassette or digital versatile disks, musical recordings available on compact discs, movies and/or musical recordings downloadable via the Internet, etc.

The consumption site 18 shown in FIG. 1 is typically associated with the viewing location of a person subscribing to or otherwise enabled to access the services provided by one or more of the digital broadcast stations/services 12 although it may also be the site of a digital television having access to a non-subscription broadcasting system/service. The consumption site 18 may be the home of an individual, a business location, including, without limit, any location, indoor or outdoor, at which content may be consumed. Although one consumption site (i.e., the consumption site 18) is shown in FIG. 1 for purposes of simplifying the following description, a plurality of other such consumption sites typically have access to the signals transmitted by the digital broadcast stations 12. Likewise, while a single reference site 20 is shown in FIG. 1, other such reference sites could be included within the system 10.

While the reference site 20 is described below as having a single signal processing channel (i.e., the ability to process content delivered via a single channel at any given time), multiple signal processing channels are typically employed. Thus, the reference site 20 is typically configured to process information associated with multiple channels and multiple content simultaneously, thereby enabling the reference site 20 to generate a library of content identification information. In light of the exemplary system 10 being described herein as a digital television broadcast system, the content delivered thereby is hereinafter referred to as television programs or programs. However, as described above, the system 10 is not limited to processing television programs to generate signatures but may instead be used to process any type of digital audio content and/or digital video content. Each of the signal processing channels may be tuned to a particular channel or program so that information associated with each of those tuned channels or programs may be processed simultaneously to develop a library of reference information (e.g., signature information) over a given time period (e.g., a rolling twenty-four hour period).

In general, the example reference site 20 shown in FIG. 1 receives signals from the digital broadcast stations 12 and selectively processes one or more broadcast program data streams contained within those signals to generate a series of reference signatures for each program data stream that is selected for processing. The reference signatures are generated by using or extracting raw binary information contained within the digital program data streams so that, within a particular time interval, each series of reference signatures is substantially uniquely characteristic of the program data stream from which the reference signature generation information was extracted. Thus, as will be described in greater detail below, the reference signature information may be used to later identify broadcast programs from which the reference signature information was derived. For example, a reference signature generated using the information contained within a known television program signal may be used to identify that television program within an unknown or unidentified signal. More specifically, if the unknown or unidentified signal contains a signature which substantially matches the reference signature information associated with a known program, it can be reliably determined that the unknown or unidentified signal contains the known program.

The consumption site 18 is located within the same broadcast region as the reference site 20 and, therefore, receives the same broadcast signals that are received at the reference site 20. The consumption site 18 generates a series of signatures in a manner similar or identical to that of the reference site 20 for the program currently being consumed (e.g., viewed, listened to, etc.) at the consumption site 18. However, as the subscriber or user at the consumption site 18 changes the currently selected program, the series of signatures generated by the consumption site 18 changes in a corresponding manner. Thus, the series of signatures generated by the consumption site 18 may include a plurality of distinct signature sequences, each of which may correspond to a different program, and each of which may have a length corresponding to the amount of time spent consuming that program (e.g., the amount of time during which the consumption site 18 was tuned to that program).

As described in greater detail below, a program consumption analyzer 22 receives the series of signatures generated by the consumption site 18 (and other consumption sites in the event more than one consumption site is used within the system 10) and compares the signatures therein to the reference signatures generated by the reference site 20. Typically, the program consumption analyzer 22 does not receive any program identification information along with the series of signatures received from the consumption site 18 because the consumption site 18 is not typically configured to generate such information. The program consumption analyzer 22 can compare the series of signatures generated by one or more consumption sites such as, for example, the consumption site 18, to reference signatures associated with known programs to ascertain the identities of programs viewed and the times at which the programs were viewed at the consumption site 18.

Now turning in detail to the reference site 20 shown in FIG. 1, a signal processor 24 extracts data associated with a particular channel as determined by a channel selector 26. The signal processor 24 can use known techniques to demodulate, demultiplex (if a multi-program signal has been demodulated), and decode program data received via the link or communication path 16. Some or all of the data extracted by the signal processor 24 may be audio data sent in conjunction with video information such as, for example, digital television signals, advertisements, etc. Alternatively, some or all of the data extracted and processed by the signal processor 24 may be video data or information. In the case where the signal processor 24 receives digital television signals from the digital broadcast stations 12, the channel selector 26 controls the signal processor 24 to extract data packets having a particular identifier (e.g., in the data packet header) associated with a particular broadcast channel.

Each of the broadcast stations 12 may transmit one or more digital data streams, each of which may be associated with a particular major channel. In turn, each major channel may include two or more minor channels or sub-channels, each of which may include a video data stream and one or more audio data streams. The reference site 20 retains program lineup information that supplies tuning information to the channel selector 26. For example, the lineup information may provide packet identifiers for each of the major and minor channels, video data streams, audio data streams, etc. along with program identification information (e.g., program titles or names) for each of the channels indexed over time. In this manner, the channel selector 26 can be configured using the program lineup information to cause the signal processor 24 to select video and/or audio data packets having identifiers associated with a particular major and/or minor channel. Typically, in the case where more than one signal processing channel is employed within the reference site 20, each processing channel has a channel selector configured to cause its corresponding signal processor to select data packets associated with a different channel. In that case, as noted above, the reference site 20 can be configured to generate signature information simultaneously for a plurality of channels for a predetermined period of time (e.g., a rolling twenty-four hour period).

In some example systems, one or more broadcast programs may be associated with more than one audio data stream. For example, multiple audio data streams, each of which is associated with a different language, may be associated with a single video program. In cases where a broadcast channel or program includes a plurality of alternative audio data streams, the signal processor 24 may selectively extract or parse data packets associated with one, some or all of the available audio data streams.

The signal processor 24 sends extracted or parsed data packets associated with the currently selected channel to a signature generator 28. The signature generator 28 uses information within the extracted data to generate a series of signatures substantially uniquely characteristic of the selected program or channel data stream(s). In examples where the currently selected channel includes a plurality of alternative audio data streams, the signature generator 28 may receive data packets associated with one, some or all of those audio data streams from the signal processor 24 and generates a series of signatures for each of the data streams. As described in greater detail in connection with FIGS. 2 and 3, the signature generator 28 may combine or otherwise use portions of data packets to generate signatures. In particular, the signature generator 28 may concatenate cyclical redundancy check (CRC) values associated with the data packets in a manner that generates a series of digital values (i.e., signatures) that is substantially unique to the program data stream currently being extracted by the signal processor 24.

The reference site 20 also includes a time stamper 30 and a program identification stamper 32. The time stamper 30 associates a time value with each signature value generated by the signature generator 28. The program identification stamper 32, based on the channel currently selected by the channel selector 26, uses program lineup information and the time stamp values to identify the program currently being processed by the signal processor 24. In addition, the program identification stamper 32 associates the information pertaining to the identity of the program currently being processed with the signature information generated by the signature generator 28. Each generated reference signature is stored along with its time stamp and program identification information within a reference site database 34.

Reference signature information may be generated for multiple programs and, in some cases, multiple audio/video data streams for one or more of the multiple programs, and stored within the reference site database 34. For example, the signal processor 24 and channel selector 26 could be configured to select different programs or channels at different times for processing. In that case, the reference site database 34 contains reference signatures for different programs, where the reference signature information generated for each program was generated at a different time.

Additionally or alternatively, as noted above, the reference site 20 may be configured to provide multiple processing channels so that reference signature information can be generated for a plurality of programs simultaneously. In that case, the reference site 20 may include an additional signal processor 24, channel selector 26, signal generator 28, time stamper 30 and/or program identification stamper 32 for each additional processing channel. In the case where the reference site 20 includes multiple processing channels, each of the channel selectors 26 is typically configured to cause its corresponding signal processor 24 to extract data packets associated with a different major and/or minor broadcast channel. Also, once configured, the channel selectors 26 are typically not reconfigured and, thus, control their respective channels to extract data packets associated with a particular channel on an ongoing basis.

The consumption site 18 includes a signal processor 36, a signature generator 38, a time stamper 40 and a consumption site database 42, all of which may be similar to the signal processor 24, the signature generator 28, the time stamper 30 and the reference site database 34, respectively. However, as depicted in the example system 10 of FIG. 1, the consumption site 18 does not have blocks similar to the program identification stamper 32 and the program selector 26. While the consumption site 18 may employ an apparatus that enables a user or subscriber to control program selection, any such program selection apparatus does not output information that can be readily used to extract and store currently selected program identification information in the consumption site database 42.

The time stampers 30 and 40 are preferably substantially synchronized so that if the signature generators 28 and 38 generate signatures at substantially the same instant of time, the time values generated by the time stampers 30 and 40 and associated with those signatures are substantially the same. However, as described in greater detail below, absolute synchronization of the time stampers 30 and 40 is not required if the program consumption analyzer 22 is configured to look for signature matches in the reference site database 34 within a window (i.e., a range) of time surrounding a suspected time at which a consumption site signature was generated.

Any or all of the signal processors 24, 36, the signature generators 28, 38, the time stampers 30, 40, the program identification stamper 32, the channel selector 26, the reference site database 34, the program consumption analyzer 22 and the consumption site database 42 may be implemented using any desired combination of hardware, firmware and/or software. For example, each of the reference site 20, the consumption site 18 and the program consumption analyzer 22 may utilize a computer system or other processor system that executes machine readable instructions or programs to implement the apparatus and methods described herein. The machine readable instructions or programs may be embodied in software stored on a tangible medium such as a CD-ROM, a floppy disk, a hard drive, a digital versatile disk (DVD), and/or a memory.

The databases 34, 42 may be implemented using any known mass storage device(s) such as, for example, magnetic and optical disk drives. In addition, the databases 34, 42 may be combined into a single or common database, which may be embodied on a single or multiple mass storage devices, accessible by the program consumption analyzer 22.

Figure 2:
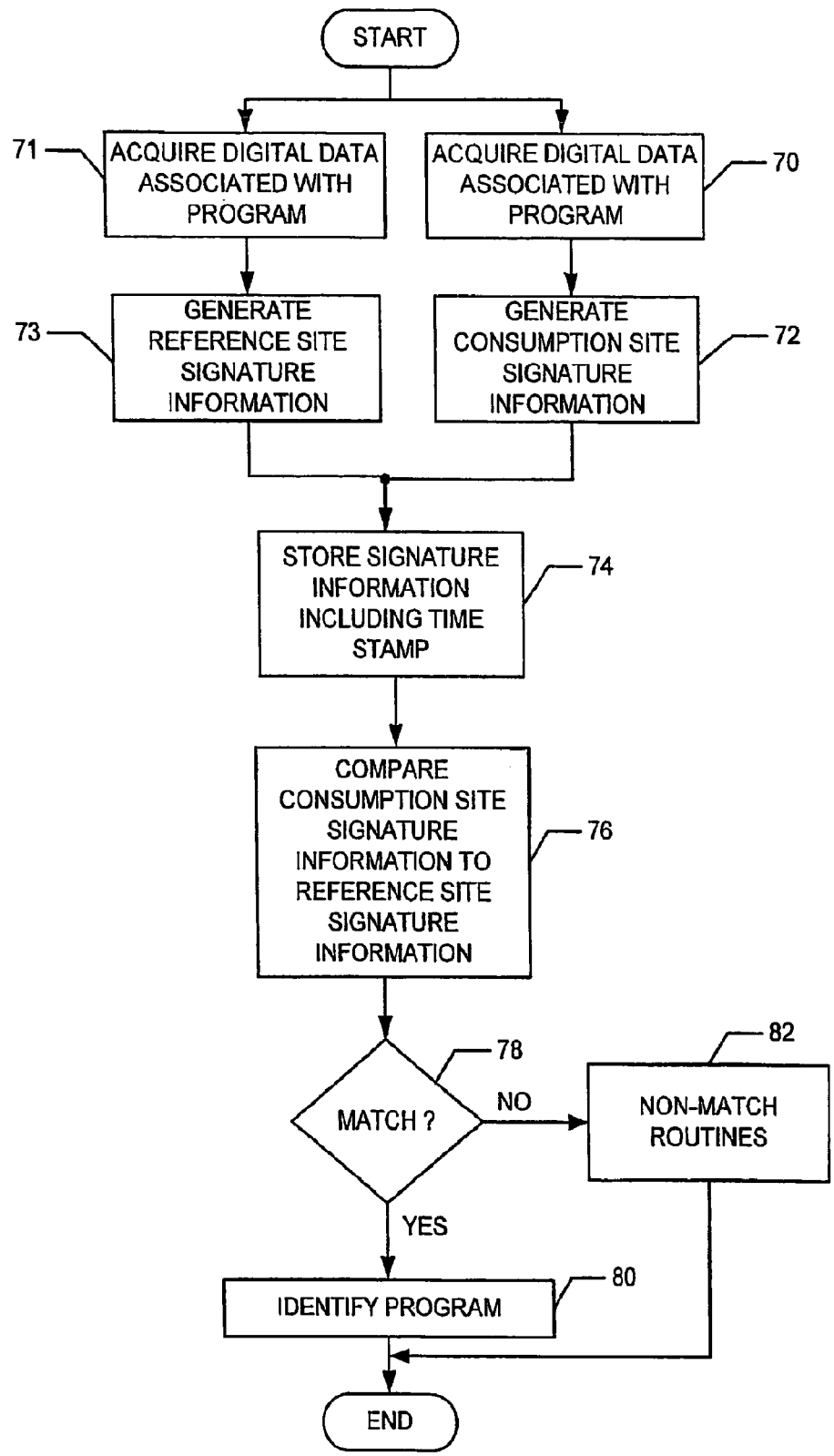
FIG. 2 is flow diagram of an example manner in which the system shown in FIG. 1 may be used to identify digital audio/video content consumed at a consumption site.

FIG. 2 is flow diagram of an example manner in which the system 10 shown in FIG. 1 may be used to identify digital broadcast programs consumed at the consumption site 18. The signal processors 24, 36 acquire data associated with a program selected for consumption by a user at the consumption site 18 (blocks 70, 71). For example, the signal processors 24, 36 may extract or parse audio and/or video data associated with a particular program from a multi-program digital television signal sent by the digital broadcast stations 12 (blocks 70, 71). The signature generators 28, 38 then generate signature information by, for example, concatenating CRCs or portions of CRCs associated with the extracted data (blocks 72 and 73). Each signature may, for example, be generated using a portion of one or more CRCs in a manner that results in a substantially unique digital value that is substantially uniquely characteristic of the extracted data and, thus the program, currently being consumed at a particular time. In general, generating a signature composed of a large number of bits increases the probability that the signature is unique to the program currently being consumed (i.e., decreases the probability that another program, if consumed at the same time, would result in the same signature). However, signatures having a large number of bits increases processing overhead and, thus, may decrease the overall processing speed and efficiency of the system 10 (FIG. 1). Each signature generated by the signature generators 28, 38 is stored along with a time stamp generated by the time stampers 30, 40 (block 74).

The program consumption analyzer 22 (FIG. 1) extracts the signature information or data (along with associated time stamps) stored within the consumption site database 42 and compares this signature information to the reference signature information stored within the reference site database 34 during a relevant time period (block 76). In particular, the program consumption analyzer 22 examines the time stamp values associated with the signatures from the consumption site database 42 that are currently being analyzed to reference signature information stored within the reference site database 34 during a relevant range of times or window of time. Due to unequal signal transmission delays between the digital broadcast stations 12 and the sites 18 and 20, the program consumption analyzer 22 may compare the signature information from the consumption site database 42 that is currently being analyzed to reference site information that was acquired over a somewhat longer amount of time (i.e., a wider or larger time window). For example, the comparison may extend several seconds prior to and following the time associated with the earliest and latest time stamps of the consumption site signature information being analyzed, thereby eliminating the need for absolute or precise synchronization between the sites 18 and 20 (e.g., the time stampers 30 and 40).

Because the user at the consumption site 18 can change the program being consumed (e.g., by changing channels), the program consumption analyzer 22 analyzes the series of signatures provided by the consumption site database 42 using sets or blocks of signatures representative of consumption activity over a relatively brief time interval such as, for example, thirty seconds. Of course, any other time interval could be used instead.

For each comparison made, the program consumption analyzer 22 determines whether a substantial match of the consumption site signature information has been found within the reference site database 34 (block 78). If a substantial match has been found, the program consumption analyzer 22 uses the program identification information stored along with the reference signature information to identify the program that was consumed within the consumption site 18 (block 80). In the event that a match is not found, any desired non-match handling routines may be used to determine and initiate an appropriate action (block 82). For example, such non-match handling routines may include a window adjustment routine to enable adjustment of the relevant time window used by the program consumption analyzer, may display or otherwise output a closest match for final determination by, for example, a reference site operator.

FIG. 3 is a diagrammatic view of an example data stream 100 that may be used with the example system 10 shown in FIG. 1. The example data stream 100 includes a plurality of data packets 102, 104 and 106 having respective payload or data portions 108, 110 and 112, respective CRC portions 114, 115 and 116 and respective header portions 117, 118 and 119. The payload portions 108, 110 and 112 include information related to audio and/or video content that may be presented to a user via an output device. On the other hand, the CRC portions 114, 115 and 116 and header portions 117, 118 and 119 are non-payload digital information.

The data stream 100 may be compliant with any known digital transmission protocol or standard. For example, in the case where the digital broadcast stations 12 are transmitting digital television signals that are compliant with the Advanced Television Systems Committee (ATSC) standard, the data stream 100 may be a Dolby AC-3 compliant digital audio signal. By way of background, the Dolby AC-3 standard is a compressed multi-channel digital audio standard that was developed by the Dolby Corporation and that was adopted by the ATSC for use with digital television transmissions within the United States of America. In any event, if the data stream 100 is an AC-3 compliant data stream, the data packets 102, 104 and 106 are transmitted at a rate of 31.25 per second (i.e., a packet every 32 milliseconds) and the CRCs 114-116 within the data packets 102, 104 and 106 are sixteen-bit values.

The digital data stream 100 may instead be compliant with other protocols or standards such as, for example, the European Digital Video Broadcast (DVB) standard, the Japanese Terrestrial Integrated Services Digital Broadcasting (ISDB-T) standard, Motion Picture Expert Group-2 (MPEG-2) standard, MPEG-1, MPEG-3, MPEG-4 Advanced Audio Code or any other version of MPEG, or any other similar or different digital video and/or audio transmission standard or protocol. In general, any digital data stream that provides audio and/or video information that can be extracted from the data stream can be used to implement the signature-based program identification apparatus and methods described herein. Thus, any digital data stream that can be used to generate unique signatures may be used. By way of example, any digital data stream having a substantially random sequence of digital values, e.g., CRCs or any other predetermined data packet portions that are computationally related to data packet content, may be used to generate unique signatures. More specifically, predetermined data packet portions that are computed based on other portions of data packet content (e.g., CRCs) can provide sufficiently random sequences of digital values that may be used to implement the apparatus and methods described herein. It should be understood that while the sequences of digital values generated by the apparatus and methods described herein are, numerically speaking, substantially random, they are computationally deterministic with respect to the channel and program data packets from which they are derived. As a result, the sequences of digital values generated using the apparatus and methods described herein are substantially uniquely characteristic of the content from which they are derived.

Further, it should be understood that both broadcast station characteristics and program content can contribute to the uniqueness of the digital sequences generated using the apparatus and methods described herein. Thus, in the event that a program is transmitted simultaneously (e.g., simulcast) by two or more broadcast stations, the digital sequences generated by two or more receiving stations (e.g., reference sites and consumption sites) for two or more simulcast versions of a program using the apparatus and methods described herein can, nevertheless, be different due to differences in the characteristics of the broadcasting stations. For example, it is highly improbable that two broadcast stations encoding the same program will encode (e.g., compress) the program content in precisely the same manner to generate identical digital data packets. Thus, if CRCs, or any other predetermined data packet portions that are computationally related to other data packet content, are used to form signatures for two or more versions of a simulcast program, each version of the simulcast program will yield a different, distinguishable sequence of digital values.

FIG. 4 is a diagrammatic view of an example manner in which program reference signature information may be generated using an example digital data stream 120. The example digital data stream 120 includes a plurality of data packets 122, 124, 126, 128 and 130 having respective data portions 132, 134, 136, 138 and 140, respective CRCs 141, 142, 143, 144 and 145, and respective header portions 146, 147, 148, 149 and 150. The example data stream 120 is associated with a particular type of program (e.g., a digital television program).

As depicted in the example of FIG. 4, the signature generator 28 (FIG. 1) forms signatures for selected ones of the data packets 122, 124, 126, 128 and 130 (as opposed to all of the data packets) to reduce the amount of reference signature information generated and, thus, the amount of reference signature information to be stored in the reference site database 34. Although the example of FIG. 4 depicts signatures being generated for half the data packets (i.e., by skipping every other data packet), more or fewer data packets could be skipped (i.e., a signature may be generated for every X data packets) if desired or, alternatively, signatures could be generated for every data packet. In general, as the number of skipped data packets increases, the amount of signature information generated for the program associated with the data stream 120 decreases. However, as will been seen in connection with the following discussion, as the amount of reference signature information generated decreases, the amount of signature information generated by the consumption site 18 may have to be significantly increased to guarantee that the signature information generated at the consumption site 18 will include at least one or two reference signature matches.

The signature generator 28 generates a signature S(N) by combining portions of the CRCs 143 and 145. Such a combination may involve a concatenation of the entire CRCs 143 and 145, a concatenation of equal size or unequal size portions of the CRCs 143 and 145, a mathematical or logical operation (e.g., a summation, division, multiplication, ANDing, ORing, etc.) using the CRCs 143 and 145 (or portions thereof) as operands, or some other combining technique. One reference signature generation technique that is particularly useful in the case where the example data stream 120 is an AC-3 compliant audio data stream concatenates the CRCs of data packets that are a predetermined number of data packets apart. With this reference signature generation technique, the signature S(N) of a data packet N is mathematically given by Equation 1 below where the value "X" is the number of data packets skipped between signature generations.

$$S(N) = CRC(N+X) * 2^{16} + CRC(N) \qquad \text{Equation 1}$$

Thus, if the number of data packets skipped between signatures equals thirty-two, the generation of signatures starting with a data packet "1" according to Equation 1 above results in the generation of signatures S(1), S(33), S(65), S(96) . . . . More generally, the use of Equation 1 as described above generates signatures S(N) using a sliding window of two CRCs that are X data packets apart. This sliding window is shown in two successive positions represented by the brackets labeled S(N) and S(N+X), respectively, of FIG. 4.

Of course, the reference signature generation technique represented diagrammatically in FIG. 4 is only one example and many other variations of the technique shown thereby may be employed with similar results. For example, the number of data packets skipped (i.e., value X) may be made greater than or less than thirty-two. Further, the number of bits in the resulting signatures may be less than or greater than thirty-two. For example, four bits of the data packet N+X may be concatenated with the full sixteen bits of the data packet N to form a twenty bit signature. Still further, bits from more than two CRCs may be used to form each signature, in which case, signatures could have more than thirty-two bits. In the case where three or more CRCs are combined, the sliding window can be envisioned as having three or more corresponding prongs. Still further, in the case where three or more CRCs are used to generate signatures, the CRCs may be evenly spaced within the data stream so that there are equal numbers of skipped data packets between each of the CRCs. Alternatively, the CRCs may be spaced in an unequal manner so that the number of skipped data packets between one pair of CRCs used to generate a signature is greater than or less than the number of skipped data packets between another pair of CRCs used to generate that same signature.

FIG. 5 depicts an example data structure 170 that may be used to store reference signature information generated using the technique shown in FIG. 4 for a plurality of programs 172, 174 and 176. The data structure 170 shown in FIG. 5 depicts signature information for three programs (i.e., programs A, B and C) being generated substantially simultaneously. In other words, population of the data structure 170 with reference signature information requires the reference site 20 (FIG. 1) to have multiple signal processing channels that simultaneously capture or extract data packets associated with three programs. The reference signature values are stored in the data structure 170 according to the program with which they are associated (i.e., Program ID) and the times at which the data packets to which the reference signature value corresponds were acquired. In examples where reference signature information is generated using the technique described in connection with FIG. 4, the data stream 120 is an AC-3 compliant audio data stream, and the sliding window skips thirty-two packets (i.e., X=32), the times T(N), T(N+X), etc. are one second apart, and the reference signatures are generated using pairs of CRCs that are thirty-two packets (i.e., one second) apart (i.e., $S_A(N)$, $S_A(N+32)$, $S_A(N+64)$, etc.)

When comparing consumption site signature information (retrieved from the consumption site database 42 shown in FIG. 1) to reference site signature information, which may be stored in the reference site database 34 (FIG. 1) using a data structure similar or identical to the data structure 170 (FIG. 5), the program consumption analyzer 22 uses the time data (i.e., data associated with the columns T(N), T(N+X), etc.) to limit the comparison to a relevant time window. For example, if the signature information processed by the program consumption analyzer 22 includes signatures generated at times T(N+X) and T(N+2X), the program consumption analyzer 22 may compare all of the reference signatures associated with the columns T(N+X) and T(N+2X) with the consumption site signatures currently being processed.

Although the time stampers 30, 40 are preferably substantially synchronized to maintain approximately the same absolute time, transmission delay times may result in the reference site 20 and the consumption site 18 processing data packets and generating signatures therefrom at somewhat different times. As a result, the time stamps accompanying consumption site signatures may not precisely match the time stamps associated with corresponding reference signatures (e.g., T(N), T(N+X), etc. of the data structure 170 of FIG. 5) and, in some cases, could be time shifted several seconds or more. Thus, when performing comparisons, the program consumption analyzer 22 may use a tolerance or delay error window to determine if a time stamp associated with the consumption site 18 corresponds to a time stamp associated with the reference site 20, but for a difference in data extraction time and/or transmission delay time. For example, if a time stamp associated with a consumption site signature is an absolute time T, the program consumption analyzer 22 may look for signature matches within the reference site database 34 (within, for example, a data structure similar or identical to the database 170 of FIG. 5) over a time window of T−$W_1$ to T+$W_2$, where $W_1$ may be, for example, three seconds and $W_2$ may be, for example, five seconds. Of course, other values for $W_1$ and $W_2$, including equal values, could be used instead.

Before discussing additional example techniques for generating consumption site signatures, it should be recognized that to enable exact matching of signatures between the reference site 20 and the consumption site 18, individual signatures are generated in a consistent manner at the reference site 20 and the consumption site 18. Thus, for example, if the reference site 20 generates signatures by concatenating pairs of CRCs that are thirty-two data packets apart, then the individual signatures generated at the consumption site 18 are also generated by concatenating pairs of CRCs that are thirty-two data packets apart.

Although the techniques used at the consumption site 18 and the reference site 20 for generating individual signatures are consistent or the same, the sets of signatures generated by the consumption site 18 and the reference site 20 do not necessarily have to be the same. In other words, the consumption site 18 may generate sets of signatures that include signatures associated with data packets for which the reference site 20 has not generated signatures. Likewise, the reference site 20 may generate signatures for data packets for which the consumption site 18 has not generated signatures. Of course, the sets of data packets for which signatures are generated by the consumption and reference sites 18 and 20 have to overlap sufficiently (i.e., a sufficient number of matching signatures) to enable the program consumption analyzer 22 to reliably identify programs consumed at the consumption site 18 based on the reference signature data.

Figure 6:
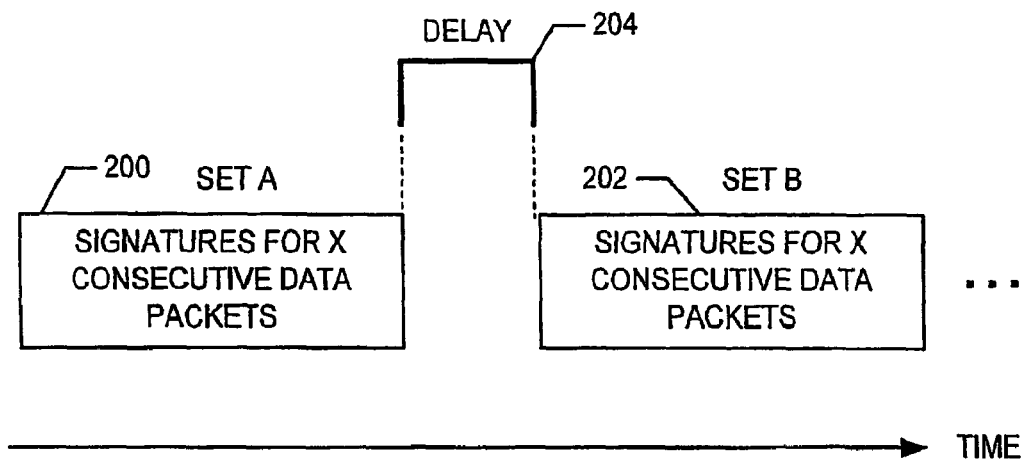
FIG. 6 is a diagrammatic view of an example manner in which sets of data stream signatures may be generated at the consumption site shown in FIG. 1.

FIG. 6 is a diagrammatic view of an example manner in which sets of signatures associated with a program data stream may be generated by the consumption site 18 shown in FIG. 1. In general, the technique depicted in FIG. 6 repeatedly generates signatures for blocks or sets of consecutive data packets 200 and 202 separated by a delay 204. Each of the signatures within the sets 200 and 202 is generated in the same manner as individual signatures generated at the reference site 20. For example, in the case where the reference signatures are generated using the technique depicted in FIG. 4, each of the signatures within the sets of signatures 200 and 202 is generated using pairs of CRCs that are thirty-two packets apart.

In addition, each of the sets of signatures 200 and 202 is of a size and, thus, extends over a time period, that guarantees that at least one reference signature corresponding to a data packet for which a signature was generated by the consumption site 18 and included in the set would have been generated by the reference site 20 during the same time period. As indicated above, the sets of signatures 200 and 202 are composed of signatures for consecutive data packets (i.e., no data packets are skipped within a set). Thus, in a case where the reference site 20 generates signatures using the technique depicted in FIG. 4 using pairs of CRCs that are thirty-two packets apart and skipping thirty-two packets between signatures, the sets 200 and 202 include at least thirty-two consecutive signatures, which requires the acquisition of sixty-four consecutive data packet CRCs. In this manner, each of the sets 200 and 202 could include at least one signature corresponding to a reference signature.

The duration of the delay 204 may be selected to correspond to the nature of program consumption behavior (e.g., channel changing behavior of users). For example, the delay 204 may be selected to be about thirty seconds or any other desired amount of time that enables the signature information gathered at the consumption site 18 to accurately depict the program consumption activities at the consumption site 18. Further, the delay 204 may also be selected to minimize, in view of the accuracy needed in connection with identifying program consumption activities, the amount of data extraction (e.g., CRC extraction), signature generation, signature data storage and comparison activity performed. In general, as the duration of the delay 204 increases, the accuracy (i.e., the resolution) with which program consumption activities can be determined decreases and the amount of data processing and storage requirements decreases.

Figure 7:
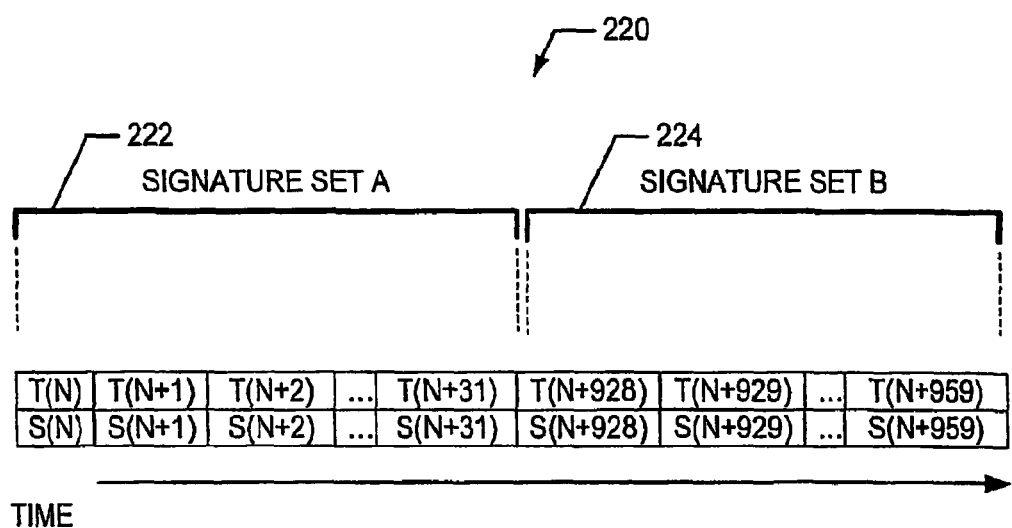
FIG. 7 is an example data structure that may be used to store consumption site signature information generated using the technique depicted in FIG. 6.

FIG. 7 is an example data structure 220 that may be used to store consumption site signature information using the technique depicted in FIG. 6. In general, the example data structure 220 is formed as an array of signature values (i.e., S(N), S(N+1), etc.) and associated time stamps (i.e., T(N), T(N+1), etc.). First and second signatures sets 222 and 224 correspond to the signature sets 200 and 202, respectively, of FIG. 6. By way of example, each of the signature sets 222 and 224 includes thirty-two signature values. However, due to the delay 204 (FIG. 6), signature values for 864 data packets are skipped in this example and, as a result, the signatures for data packets N+32 to N+927 are not generated. In the case where the data stream provides data packets at a rate of 31.25 per second (e.g., an AC-3 audio data stream), 864 skipped packets corresponds to about twenty-seven seconds.

In addition to the example signature generation methods discussed in connection with FIGS. 4-7, other methods of generating signature information within the consumption and references sites 18 and 20 are possible. For example, in another example method, signatures may be formed for every $m^{th}$ CRC within data streams processed by the consumption site 18 and every $n^{th}$ CRC within data streams processed by the reference site 20, where m and n are relatively prime. In this manner, matching signatures will only be generated at every m*n packets. Each of the signatures may be, for example, composed of twenty bits taken from two consecutive CRCs. However, any other number of consecutive CRCs and/or bits may be used instead.

In still another example method, reference signature information may be generated at the reference site 20 by dividing CRCs by a predetermined whole number and storing only those CRCs that are evenly divisible by the whole number along with the number of CRCs since the last evenly divisible CRC was stored in the reference site database 34. Thus, under this method, the reference site database 34 includes data pairs including the number of CRCs since the last CRC evenly divisible by the predetermined whole number was recorded and an associated CRC value. With this example method, data pairs are generated in the same manner as in the reference site 20 over a period of time sufficient to enable reliable comparisons to be performed. Under this method it is possible for a relatively large number of CRCs to be skipped (i.e., that are not evenly divisible by the predetermined whole number). As a result, it is possible to select a maximum number of CRCs that are allowed to elapse. When this maximum number of CRCs has elapsed, regardless of whether the current CRC is divisible by the predetermined whole number, the current CRC value is stored along with the number of CRCs occurring since the last CRC was stored.

More generally, signatures may be formed using one or more predetermined portions of the data packets composing a digital program stream. For example, rather than CRCs (or portions thereof), signatures may be generated using portions of data packets that are offset a predetermined number of bits from the header portion of the data packets. Additionally, signatures may be formed using all or part of the digital metadata that may form a portion of the digital audio or digital video content.

Figure 8:
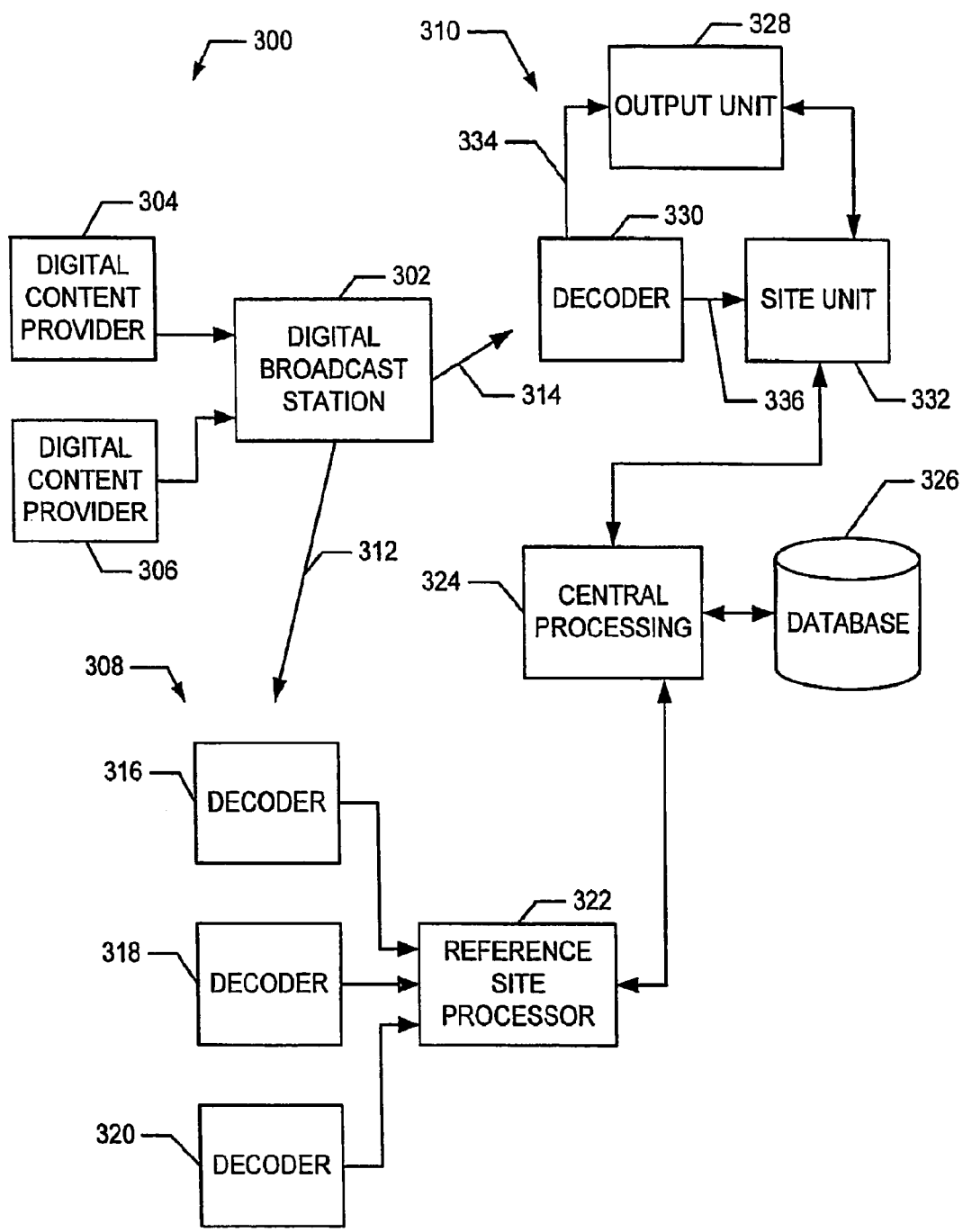
FIG. 8 is an example digital audio/video content delivery metering system that may use the signature-based program identification apparatus and methods described herein.

FIG. 8 is an example digital broadcast system 300 that may use the signature-based program identification apparatus and methods described herein. The digital television system 300 includes a digital broadcast station 302 that receives digital video and/or audio programs from a plurality of digital content providers 304 and 306. The digital content providers 304 and 306 may provide television programs, advertisements, audio (e.g., radio) programs, still image information (e.g., web pages), etc. in known manners to the digital broadcast station 302. The digital broadcast station 302 transmits one or more signals containing digital program information to a reference site 308 and at least one consumption or home site 310 via communication paths or links 312, 314. The communication paths or links 312 and 314 may be similar to the communication paths or links 14 and 16 (FIG. 1) and, thus, may include any combination of hardwired or wireless links such as, for example, satellite links, wireless land-based links, cable links, etc. The signals conveyed via the links 312 and 314 may contain multi-program data streams, which are commonly employed with existing digital television transmission systems.

The reference site 308 and the consumption or home site 310 receive and process the digital signals provided by the digital broadcast station 302 using the program identification apparatus and methods described herein. More specifically, the reference site 308 includes a plurality of decoders (e.g., set-top boxes or the like) 316, 318 and 320 that demodulate, demultiplex and decode audio, video and/or other data packets received from the digital broadcast station 302. In an example, each of the decoders 316, 318 and 320 provides data packets associated with a different program that is currently being broadcast to a reference site processor 322. In other words, the digital decoder 316 may provide data packets associated with a program A while the decoders 318 and 320 provide data packets associated with respective programs B and C. In any case, the reference site processor 322 is configured to control and/or has information indicating to which program each of the decoders 316, 318 and 320 is currently tuned.

The reference site processor 322 includes the apparatus and methods described herein for generating reference signature information for a plurality of simultaneously broadcast television programs. In particular, the reference site processor 322 may include the signature generator 28, the time stamper 30 and the program identification stamper 32, all of which are shown and described in connection with FIG. 1. In addition, the reference site processor 322 can be implemented to use any of the reference signature generation methods described herein such as, for example, the method described in connection with FIGS. 4 and 5. The reference site processor 322 sends the reference signature information it generates to a central processing facility 324, which stores the reference signature information in a database 326 using, for example, the data structure 170 of FIG. 5.

The consumption site 310 could be, for example, a statistically selected home containing a digital television, a digital radio, a computer, etc. The consumption site 310 includes an output unit 328 (e.g., a video display, speaker, etc.) The consumption site 310 also includes a decoder (e.g., a set-top box) 330, which may be similar or identical to the decoders 316-320. Such decoders are well-known and, thus, are not described in greater detail herein. The decoder 330 provides audio and/or video signals 334 to the output unit 328 that are used to output the program currently selected for consumption. In addition, the decoder 330 also provides signals containing information 336 associated with a currently tuned program to the site unit 332. Such signals may, for example, be audio signals provided using the well-known Sony/Phillips Digital Interface Format (S/PDIF), or using any other desired format that provides data packets associated with digital broadcasts.

The site unit 332 processes the signals 336 received from the decoder 330 to generate signature information therefrom and conveys the signature information to the central processing facility 324. Thus the site unit 332 includes a signature generator such as, for example, the signature generator 38, and a time stamper such as, for example, the time stamper 40, both of which may be used as described in connection with FIGS. 6 and 7 to generate consumption site signature information.

The central processing facility 324, among other tasks, is configured to perform the functions of the program consumption analyzer 22 discussed in connection with FIGS. 1 and 2. Thus, the central processing facility 324 compares signature information generated at the consumption site 328 to the reference signature information stored in the database 326 to identify the programs consumed at the consumption site 310. The central processing facility 324 may additionally analyze the program consumption information it generates for the consumption site 310 and, possibly, other consumption sites (not shown), to ascertain the consumption behaviors at those consumption sites and/or to develop ratings.

Although certain methods, apparatus and articles of manufacture have been described herein, the scope of coverage of this patent is not limited thereto. To the contrary, this patent covers all embodiments including apparatus, methods and articles of manufacture fairly falling within the scope of the appended claims either literally or under the doctrine of equivalents.

What is claimed is:

1. A method comprising:
receiving a digital data stream at a consumer site;
storing the digital data stream until playback;
generating digital signatures from the digital data stream during playback of the digital data stream at the consumer site by:
extracting a first non-payload portion from a first data packet of the digital data stream, the first data packet including the first non-payload portion and a first payload portion;
extracting a second non-payload portion from a second data packet of the digital data stream, the first data packet and the second data packet included in a first block of consecutive data packets;
concatenating the first non-payload portion and the second non-payload portion to form a first digital signature;
extracting a third non-payload portion from a third data packet, the third data packet including the third non-payload portion and a second payload portion;
extracting a fourth non-payload portion from a fourth data packet of the digital data stream, wherein the third data packet and the fourth data packet are included in a second block of consecutive data packets; and
concatenating the third non-payload portion and the fourth non-payload portion to form a second digital signature;
comparing the first digital signature and the second digital signature to one or more reference signatures in a reference signature database; and
identifying the digital data stream based on the comparison.

2. A method as described in claim 1, further comprising:
associating a first time value with the digital data stream indicating when the digital data stream was received at the consumer site; and
associating the first time value with the first digital signature when the first digital signature is generated during playback.

3. A method as described in claim 2, further comprising:
associating a second time value with each reference signature in the reference signature database;
calculating a delay window for the second time value associated with each reference signature; and
comparing the first digital signature to one or more of the reference signatures when the first time value associated with the first digital signature falls within the delay window of the second time value of one or more of the reference signatures.

4. A method as described in claim 1, further comprising developing the reference signature database based on one or more digital data streams received at a reference site, the reference signature database including a reference signature for each digital data stream received, and wherein the reference signature database is generated at the reference site.

5. A method as described in claim 1, wherein the digital data stream is delivered via a local device.

6. A method as described in claim 5, wherein the local device is a digital video recorder.

7. An apparatus comprising:
a signal processor to:
receive a digital data stream at a consumer site; and
store the digital data stream until playback;
a signature generator to generate digital signatures from the digital data stream during playback of the digital data stream at the consumer site by:
extracting a first non-payload portion from a first data packet of the digital data stream, the first data packet including the first non-payload portion and a first payload portion;
extracting a second non-payload portion from a second data packet of the digital data stream, the first data packet and the second data packet included in a first block of consecutive data packets;
concatenating the first non-payload portion and the second non-payload portion to form a first digital signature;
extracting a third non-payload portion from a third data packet, the third data packet including the third non-payload portion and a second payload portion;
extracting a fourth non-payload portion from a fourth data packet of the digital data stream, wherein the third data packet and the fourth data packet are included in a second block of consecutive data packets; and
concatenating the third non-payload portion and the fourth non-payload portion to form a second digital signature; and
a program consumption analyzer to compare the first digital signature and the second digital signature to one or more reference signatures in a reference signature database.

8. An apparatus as defined in claim 7, wherein the program consumption analyzer is to identify the digital data stream based on the comparison.

9. An apparatus as defined in claim 7, further comprising:
a time stamper to associate a first time value with the first digital signature based on when the first digital signature is generated during playback; and
wherein the program consumption analyzer is to:
calculate a delay window for a second time value associated with each reference signature in the reference signature database; and
compare the first digital signature to one or more of the reference signatures in the reference signature database when the first time value associated with the first digital signature falls within the delay window of the second time value of one or more of the reference signatures.

10. An apparatus as defined in claim 7, wherein the reference signature database is to store one or more reference signatures, wherein each reference signature corresponds to a digital data stream received at a reference site, and wherein the reference signature database is generated at the reference site.

11. An apparatus as defined in claim 7, wherein the digital data stream is delivered via a local device.

12. An apparatus as defined in claim 11, wherein the local device is a digital video recorder.

13. A machine readable storage device or storage disc comprising instructions that, when executed, cause a machine to at least:
receive a digital data stream at a consumer site;
store the digital data stream until playback;
generate digital signatures from the digital data stream during playback of the digital data stream at the consumer site by:
extracting a first non-payload portion from a first data packet of the digital data stream, the first data packet including the first non-payload portion and a first payload portion;
extracting a second non-payload portion from a second data packet of the digital data stream, the first data packet and the second data packet included in a first block of consecutive data packets;
concatenating the first non-payload portion and the second non-payload portion to form a first digital signature;
extracting a third non-payload portion from a third data packet, the third data packet including the third non-payload portion and a second payload portion;
extracting a fourth non-payload portion from a fourth data packet of the digital data stream, wherein the third data packet and the fourth data packet are included in a second block of consecutive data packets; and
concatenating the third non-payload portion and the fourth non-payload portion to form a second digital signature; and
compare the first digital signature and the second digital signature to one or more reference signatures in a reference signature database.

14. A machine readable storage device or storage disc as defined in claim 13, wherein the instructions further cause the machine to identify the digital data stream based on the comparison.

15. A machine readable storage device or storage disc as defined in claim 13, wherein the instructions further cause the machine to:
associate a first time value with the digital data stream based on when the digital data stream is received;
associate the first time value with the first digital signature when the first digital signature is generated during playback;
associate a second time value with each reference signature in the reference signature database;
calculate a delay window for the second time value associated with each reference signature; and
compare the first digital signature to one or more of the reference signatures in the reference signature database when the first time value associated with the digital signature falls within the delay window of the second time value of one or more of the reference signatures.

16. A machine readable storage device or storage disc as defined in claim 13, wherein the instructions further cause the machine to store one or more reference signatures, wherein each reference signature corresponds to a digital data stream received at a reference site, and wherein the reference signature database is generated at the reference site.

17. A machine readable storage device or storage disc as defined in claim 13, wherein the digital data stream is delivered via a local device.

18. A machine readable storage device or storage disc as defined in claim 17, wherein the local device is a digital video recorder.

19. A method as defined in claim 1, wherein the non-payload portions of the data packets are offset a predetermined number of bits from a header portion of the data packets.

20. An apparatus as defined in claim 7, wherein the signature generator is to form the digital signatures by:
   identifying portions of the data packets offset a predetermined number of bits from the header portion of the data packets, and
   concatenating the identified portions of the data packets.

21. A method as defined in claim 1, wherein the non-payload portion of the digital data stream includes a cyclical redundancy check.

22. A method as defined in claim 1, wherein the first data packet and the second data packet are consecutive data packets in the digital data stream.

23. A method as defined in claim 1, wherein the first data packet and the second data packet are at least two data packets apart in the digital data stream.

24. A method as defined in claim 1, wherein the first block of consecutive data packets and the second block of consecutive data packets are separated by a time delay.

25. A method as defined in claim 1, wherein the first block of consecutive data packets and the second block of consecutive data packets are separated by a third block of consecutive data packets.

26. A method as defined in claim 1, wherein identifying the digital data stream further comprises:
   comparing the first digital signature and the second digital signature to the one or more reference signatures in the reference signature database; and
   identifying the digital data stream based on the comparison.

27. A method as defined in claim 1, wherein the first data packet includes the first non-payload portion, the payload portion and a fifth non-payload portion.

28. A method as defined in claim 1, further comprising extracting a first subset of the first non-payload portion and a second subset of the second non-payload portion to form the first digital signature.

* * * * *